United States Patent
Moreau

[19]
[11] Patent Number: 6,046,922
[45] Date of Patent: *Apr. 4, 2000

[54] MULTISTANDARD RECTIFIED POWER SUPPLY CIRCUIT

[75] Inventor: Jean-Michel Moreau, Grenoble, France

[73] Assignee: SGS-Thomson Microelectronics S.A., Gentilly, France

[*] Notice: This patent is subject to a terminal disclaimer.

[21] Appl. No.: 09/114,270

[22] Filed: Jul. 13, 1998

Related U.S. Application Data

[63] Continuation of application No. 08/740,418, Oct. 29, 1996, Pat. No. 5,781,427.

[30] Foreign Application Priority Data

Oct. 30, 1995 [FR] France .................................. 95 13040

[51] Int. Cl.⁷ .................................................. H02M 7/04
[52] U.S. Cl. ........................... 363/143; 363/61; 363/84; 307/110
[58] Field of Search ........................... 307/110; 323/205, 323/207, 209, 210, 211; 363/59, 60, 61, 84, 89, 142, 143

[56] References Cited

U.S. PATENT DOCUMENTS

| | | | |
|---|---|---|---|
| 3,713,018 | 1/1973 | Tscheuschner | 363/143 |
| 3,720,868 | 3/1973 | Lee | 363/89 |
| 3,851,182 | 11/1974 | Wallace | 363/60 |
| 4,268,899 | 5/1981 | Rokas | 363/61 |
| 4,665,323 | 5/1987 | Russell et al. | 363/60 |
| 4,780,805 | 10/1988 | Chewuk et al. | 363/142 |
| 4,837,672 | 6/1989 | Donze | 363/143 |
| 4,864,488 | 9/1989 | Bulmahn et al. | 363/61 |
| 4,933,832 | 6/1990 | Schneider et al. | 363/143 |
| 4,937,731 | 6/1990 | Konopka | 363/61 |
| 5,097,402 | 3/1992 | Kriz et al. | 363/143 |
| 5,119,283 | 6/1992 | Steigerwald et al. | 363/61 |
| 5,138,547 | 8/1992 | Swoboda | 363/143 |
| 5,162,984 | 11/1992 | Castagnet et al. | 363/61 |
| 5,287,263 | 2/1994 | Shilo | 363/143 |
| 5,781,427 | 7/1998 | Moreau | 363/61 |
| 5,793,626 | 8/1998 | Jiang | 363/143 |
| 5,831,846 | 11/1998 | Jiang | 363/143 |

FOREIGN PATENT DOCUMENTS 0 600 340  6/1994  European Pat. Off. ........ H05B 41/29

*Primary Examiner*—Jeffrey Sterrett
*Attorney, Agent, or Firm*—Wolf, Greenfield & Sacks, P.C.; James H. Morris; Theodore E. Galanthay

[57] ABSTRACT

A multistandard rectified supply circuit comprises, across a full wave rectifying bridge, at least one storing element associated with a charge path comprising first unidirectional conductive elements of a first polarity and with a discharge path comprising second unidirectional conductive elements of a second polarity so that the storing means is differently charged and discharged. A switch cancels the effect of at least one of the first and second unidirectional elements so that the storing element is charged and discharged through a same path.

15 Claims, 5 Drawing Sheets

MULTISTANDARD RECTIFIED POWER SUPPLY CIRCUIT

This application is a continuation of application Ser. No. 08/740,418, filed Oct. 29, 1996, entitled MULTISTANDARD RECTIFIED POWER SUPPLY CIRCUIT, now allowed U.S. Pat. No. 5,781,427.

BACKGROUND OF THE INVENTION

1. Field of the Invention

The present invention relates to a rectified power supply circuit and more particularly to such a circuit adapted to receive a high-value a.c. voltage or a low-value a.c. voltage, and that operates as a power factor correction circuit, at least for the high value supply voltage.

For example, the high a.c. voltage may be a voltage from the mains networks at 220–240 V and the low a.c. voltage may be a voltage from the mains networks at 100–117 V.

2. Discussion of the Related Art

FIG. 1A represents an example of a circuit providing a rectified supply voltage with power factor correction. This circuit includes a rectifying bridge BR having input terminals A and B connected to the mains voltage and output terminals X and Y connected to a storing and power factor correction circuit 100 and to a block 110. Block 110 incorporates a load associated with a regulation circuit such as a switch-mode circuit. Hereafter, block 110 will simply be called a "load".

The storing and power factor correction circuit comprises, between terminals X and Y, a capacitor C1 serially connected with a diode D1 and a capacitor C2, diode D1 being oriented so as to allow a charging of capacitors C1 and C2. A serial resistor R is generally provided for limiting current peaks during power-on and switching. Terminal Y is connected to a node 300 between capacitor C1 and diode D1 through a diode D2. Terminal X is connected to a node 310 between diode D1 and capacitor C2 through a diode D3. Diodes D2 and D3 are oriented so as to allow the discharge of capacitors C1 and C2 towards load 110. Generally, capacitors C1 and C2 have a same value. It is also known to substitute avalanche diodes for at least some of the diodes D1, D2 and D3.

FIG. 1B shows an equivalent diagram of circuit 100 when capacitors C1 and C2 are in a discharge phase. Then, both capacitors are parallel-connected, whereas in a charging phase they are serially charged.

The operation of this circuit will be explained in connection with FIG. 1C that illustrates the voltage V between terminals X and Y, the voltages VC1 and VC2 across each capacitor C1 and C2 (assumed of a same value) and the (rectified) current I drawn from the mains supply.

During the period t0<t<t1, capacitors C1 and C2 discharge in parallel. All the power required by load 110 is supplied by these capacitors.

At time t1, the rectified voltage Vrec equals the instantaneous voltage levels VC1, VC2 that are respectively present across capacitors C1 and C2. Diodes D2 and D3 are reverse biased. Capacitors C1 and C2 are now floating and their charge is substantially constant. Therefore, the load is directly supplied from the mains supply. This results in a rapid increase in the current drawn from the mains. During the period t1<t<t2, the rectified voltage increases and the current drawn from the mains supply decreases. The decrease in the current for an increase in the voltage is due to the fact that the load power requirements are assumed to be constant. During this period, diodes D1, D2 and D3 remain reverse biased and capacitors C1 and C2 remain floating.

At time t2, the rectified voltage substantially equals the voltage VC1+VC2 that is stored across capacitors C1 and C2 and diode D1 is thus forward biased. During the period t2<t<t3, the mains supply charges the serially connected capacitors, via diode D1, at the same time as providing power to the load. Diodes D2 and D3 remain reverse biased. Each of the capacitors is charged to Vp/2.

At time t3, the rectified voltage reaches its peak value Vp and diode D1 is again reverse biased. During the period t3<t<t4, the rectified voltage decreases and the current drawn from the mains supply increases if the load power requirements are constant. During this period, capacitors C1 and C2 maintain their charge, Vp/2.

At time t4, the rectified voltage reaches its half peak value Vp/2. Diodes D2 and D3 are forward biased and capacitors C1 and C2 start discharging in parallel as shown in FIG. 1B. The current drawn from the mains supply drops to zero. During the period t4<t<t5, the value of the rectified voltage remains less than that which is stored across each of the capacitors C1 and C2. All the power is supplied to the load by the capacitors.

Time t5 is equivalent to time t1.

An advantage of such a circuit called "power factor corrector" is that, with respect to a circuit in which the capacitor would be directly connected across the rectifying bridge BR, the time during which a current is extracted from the mains supply is increased, as shown in FIG. 1C. Therefore, the harmonics reinjected into the mains supply are reduced.

A drawback of such a circuit is that it increases the current in the load during the supply phases in which the voltage is reduced. When a switch-mode supply is used, the current in the switch is therefore increased, whereby the size of the switch must be increased. This causes an increase of the cost of the switch and of the transformer of the switch-mode power supply. However, this is necessary for improving the power factor and remains acceptable when a supply source for operating with a given mains voltage, for example 220 volts, is desired.

However, when it is desired to provide a multistandard rectifier, likely to be connected, for example as indicated above, either to a voltage of 220 volts or to a voltage of 110 volts, this drawback becomes impairing when the mains voltage is 110 volts. Indeed, in this case, if it is desired to maintain a constant power in the load, the current is doubled again. Such systems are therefore not adapted to operate with a variable voltage.

SUMMARY OF THE INVENTION

Thus, an object of the present invention is to provide a rectified supply source adapted to operate with various supply voltages and operating as a power factor corrector, at least for the higher supply voltage, without needing an oversized switch in a switch-mode supply when a low voltage supply source is used.

To achieve this object, the invention generally provides a multistandard rectified supply circuit comprising, across a full wave rectifying bridge, at least one storing means associated with a charge path comprising first unidirectional conductive means of a first polarity and with a discharge path comprising second unidirectional conductive means of a second polarity so that the storing means is differently charged and discharged, further comprising switching means for cancelling the effect of at least one of said first and second unidirectional means so that the storing means is charged and discharged through a same path.

According to an embodiment of the invention, said switching means are actuated when the a.c. input voltage is low.

The invention also provides a bi-voltage rectified supply circuit comprising, across a full wave rectifying bridge, at least two storing capacitors associated with rectifying diodes so that the capacitors are charged in series and discharged in parallel, further comprising switching means for cancelling the action of said diodes so that the two capacitors are charged and discharged through the same path.

According to an embodiment of the invention,. said switching means are actuated when the a.c. input voltage is low.

According to an embodiment of the invention, the circuit further comprises, between the high output terminal and the low output terminal of a full wave rectifier, a serial connection of a first capacitor, a resistor, a first diode, and a second capacitor; a second diode connected between a second terminal of the first capacitor and the low output; and a third diode connected between a second terminal of the second capacitor and the high output.

According to an embodiment of the invention, said switching means comprise a switch connected across the serial connection of said resistor and said first diode.

According to an embodiment of the invention, said switching means comprise a first switch connected between the second terminal of the first capacitor and an a.c. supply terminal of the rectifying bridge, and a second switch connected between the second terminal of the second capacitor and said rectified a.c. supply terminal.

According to an embodiment of the invention, said switching means comprise a first switch connected between the second terminal of the first switch and the low output and a second switch connected between the second terminal of the second capacitor and the high output.

The present invention applies in particular to rectifiers associated with domestic appliances such as dish-washers, washing-machines, microwave ovens, vacuum cleaners, refrigerators, freezers, etc.

These objects, features and advantages, as well as others, of the present invention will be discussed in detail in the following description of specific embodiments, taken in conjunction with the following drawings, but not limited by them.

DETAILED DESCRIPTION

Figure 1A:
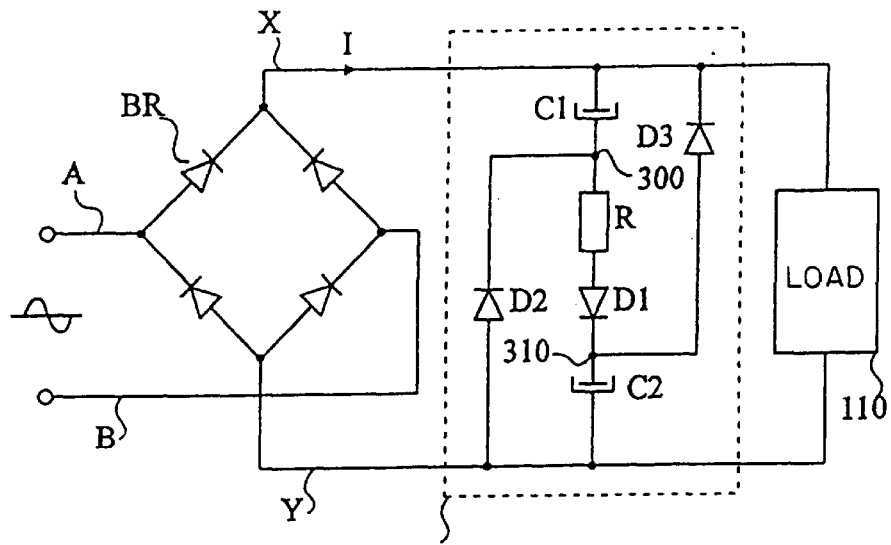
FIG. 1A, above disclosed, shows a rectifying circuit with a power factor corrector according to the prior art.
Figure 1B:
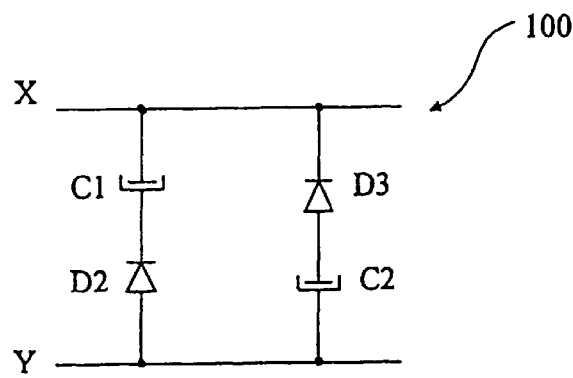
FIG. 1B represents the equivalent diagram of the power factor correction circuit in a discharge phase.

The present invention generally uses a storing and power factor correction circuit such as the one of FIG. 1A but no longer operates the circuit in the power factor correction mode when the circuit is supplied by a low voltage. For this purpose, the invention provides at least one switch for modifying the structure of the circuit, this switch being closed during the low voltage operation mode. Thereby, it is no longer necessary to provide an oversized switch in a switched-mode supply behind the storing circuit according to the invention when this circuit is supplied by a low voltage.

Figure 2B:
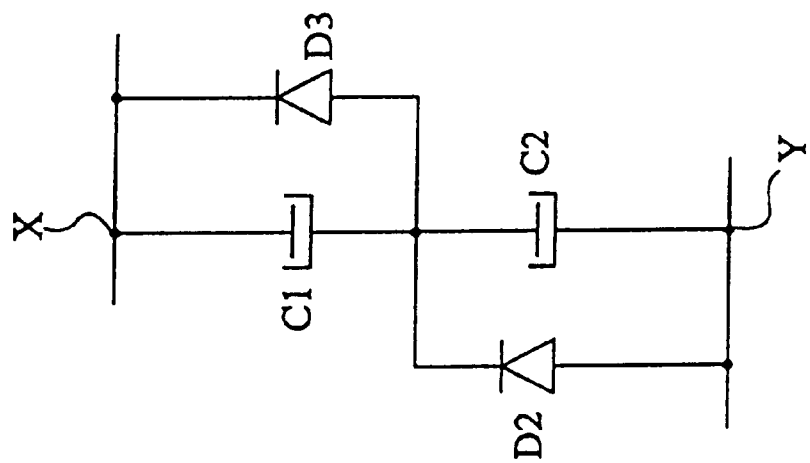
FIG. 2B represents an equivalent diagram of the circuit of FIG. 2A in its low voltage operation mode.
Figure 2A:
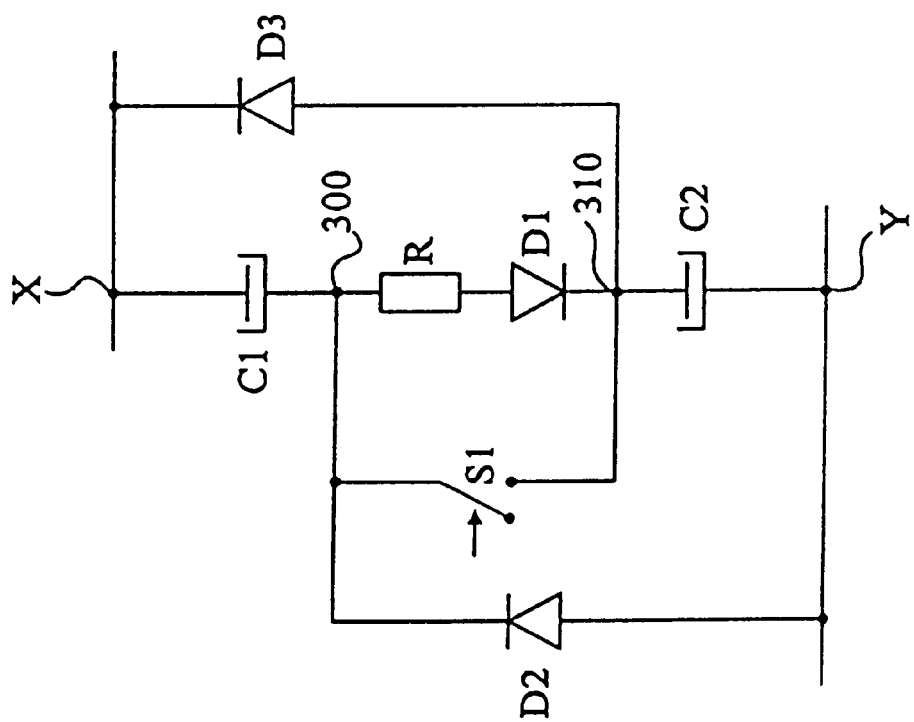
FIG. 2A illustrates a first embodiment of a bi-voltage circuit according to the invention.

FIG. 2A represents a first embodiment of the invention wherein the circuit 100 of FIG. 1A has been modified for including a switch S1 connected in parallel with the serial connection of resistor R (if it is provided) and diode D1.

When switch S1 is open, the system is identical to the one of FIG. 1A.

When switch S1 is closed, that is when the supply voltage is low, for example 110 volts, the circuit becomes as shown in FIG. 2B. Diodes D2 and D3 are no longer operative and, in the equivalent diagram, the circuit only comprises between terminals X and Y two serially-connected capacitors C1 and C2. The circuit then no longer has a power factor correction function and operates simply as a peak rectifying circuit. Capacitors C1 and C2 being serially-connected and not parallel-connected, the capacitors provide the load with the peak voltage of the mains network and it is no longer necessary to oversize the switch in a switch-mode supply included in the load 110 of FIG. 1A.

A drawback of the circuit of FIG. 2 is that, as the capacitors C1 and C2 are the same as those that are provided for supplying the load when operating at a high voltage (220 volts), and as these capacitors have an equal value C, their resultant capacitance is C/2. Therefore, the maximum stored energy may not be sufficient to maintain the load supply between two recharges of the capacitors. The following embodiments of the invention overcome this drawback.

Figure 3B:
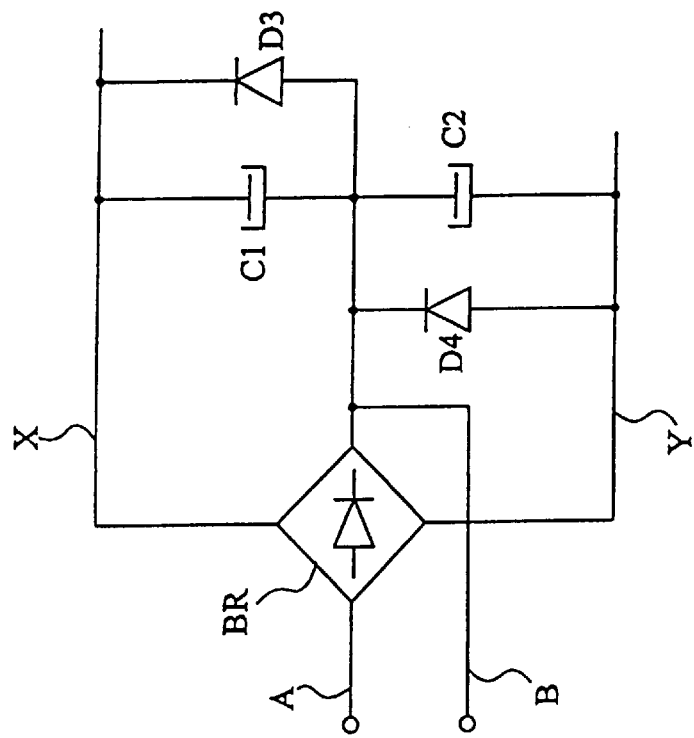
FIG. 3B represents an equivalent diagram of the circuit of FIG. 3A in its low voltage operation mode.
Figure 3A:
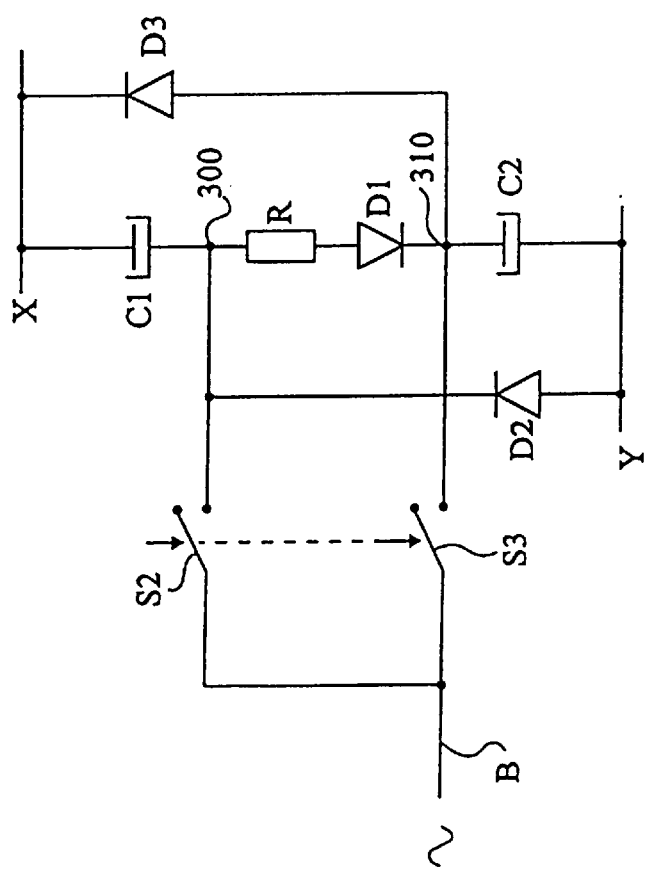
FIG. 3A represents a second embodiment of a bi-voltage circuit according to the invention.

Another embodiment of the invention is illustrated in FIG. 3A. Two simultaneously controlled switches S2 and S3 are provided. Switch S2 is connected between terminal B of the a.c. supply and node 300 between capacitor C1 and resistor R. Switch S3 is connected between terminal B and node 310 between diode D1 and capacitor C2.

When switches S2 and S3 are open, the circuit is identical to the one of FIG. 1A.

When switches S2 and S3 are closed, one obtains the circuit illustrated in FIG. 3 which has the advantage that each of the capacitors C2 and C3 is charged with the peak voltage of the mains network and that the energy stored in each capacitor is accordingly four times higher than in the case of FIG. 2B. A drawback of this embodiment is however that each capacitor is charged at half the frequency of the rectified voltage, which can also be a drawback as regards the energy storage in these capacitors.

Figure 4B:
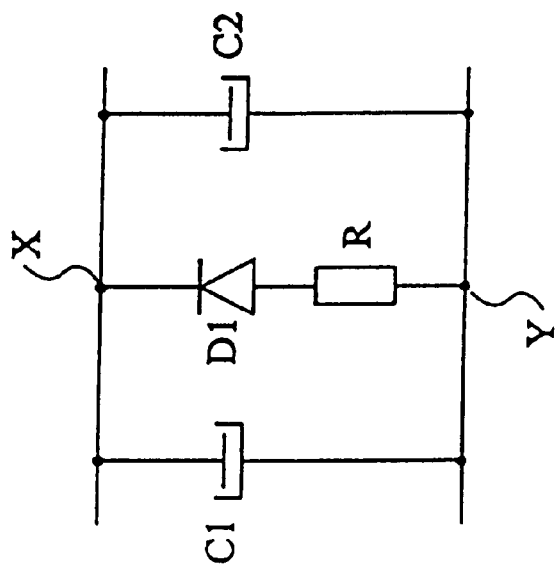
FIG. 4B represents an equivalent diagram of the circuit of FIG. 4A in its low voltage operation mode.
Figure 4A:
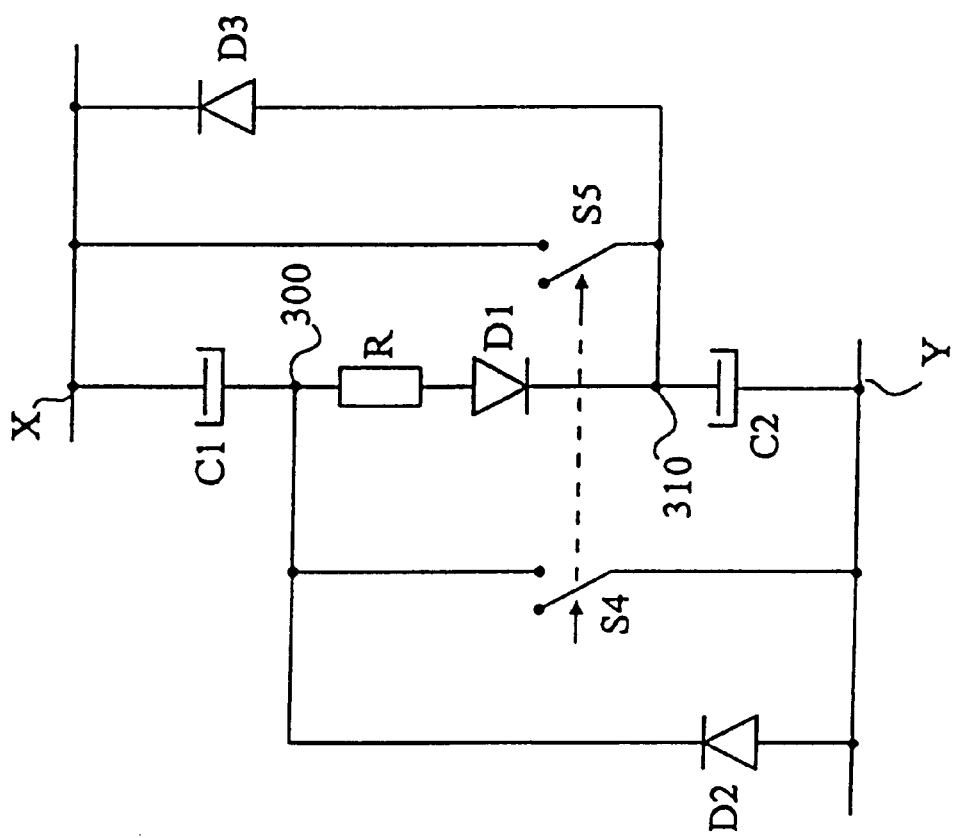
FIG. 4A represents a third embodiment of a bi-voltage circuit according to the invention.

Accordingly, a preferred embodiment of the invention is illustrated in FIG. 4A. It comprises a first switch S4 between terminal 300 and terminal Y and a second switch S5 between terminal X and terminal 310.

When switches S4 and S5 are open, the diagram of FIG. 1A is not modified.

When switches S4 and S5 are closed, one obtains the equivalent diagram shown in FIG. 4B, that is, the two capacitors C1 and C2 are parallel-connected. The branch D1-R is shown for being exhaustive. However, it has no function. As the capacitors C1 and C2 have a same capacitance C, and as they are parallel-connected, the resultant capacitance value will be 2C. Therefore, all the drawbacks disclosed above are overcome and the energy stored in the capacitors will be enough for ensuring a suitable operation of the circuit.

Of course, the switches added according to the invention may be of any known type. They may be mechanical, electromechanical or electronic, they may be manual or automatic (that is, associated with a circuit that automatically detects if the supply is a high voltage mains supply (220–240 volts) or a low voltage mains supply (100–117 volts)).

Of course, various modifications of the invention will be apparent to those skilled in the art. In particular, the invention may be adapted to circuits as the one shown in FIG. 1A comprising various known improvements, for example circuits in which some at least of the diodes D1–D3 are replaced by avalanche diodes.

More generally, the invention applies to any rectified voltage supply circuit associated with a power factor correction system and generally provides for inhibiting, if desired, the operation of the power factor correction system. This inhibition is for example achieved, as disclosed above for a circuit adapted to operate with a high a.c. input voltage or with a low a.c. input voltage, when the input a.c. voltage is low.

Figure 5:
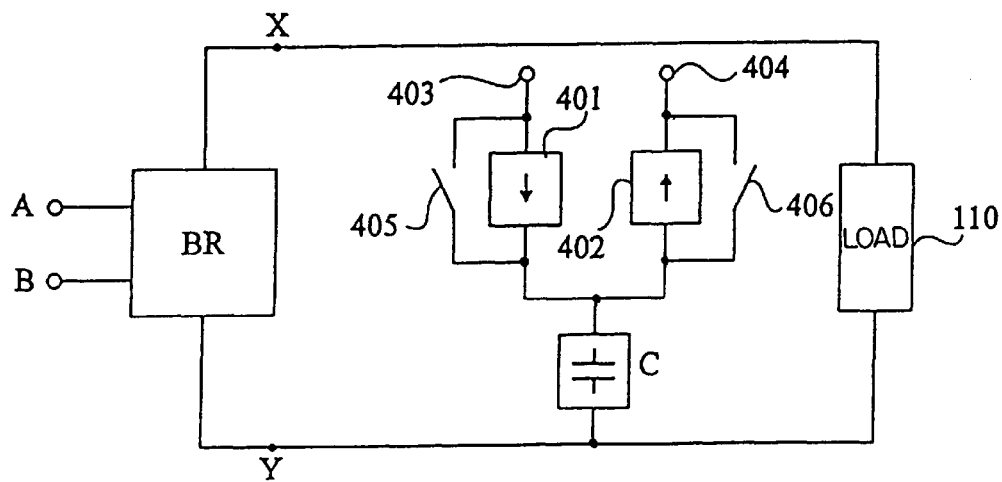
FIG. 5 illustrates a general aspect of the invention.
Figure 1C:
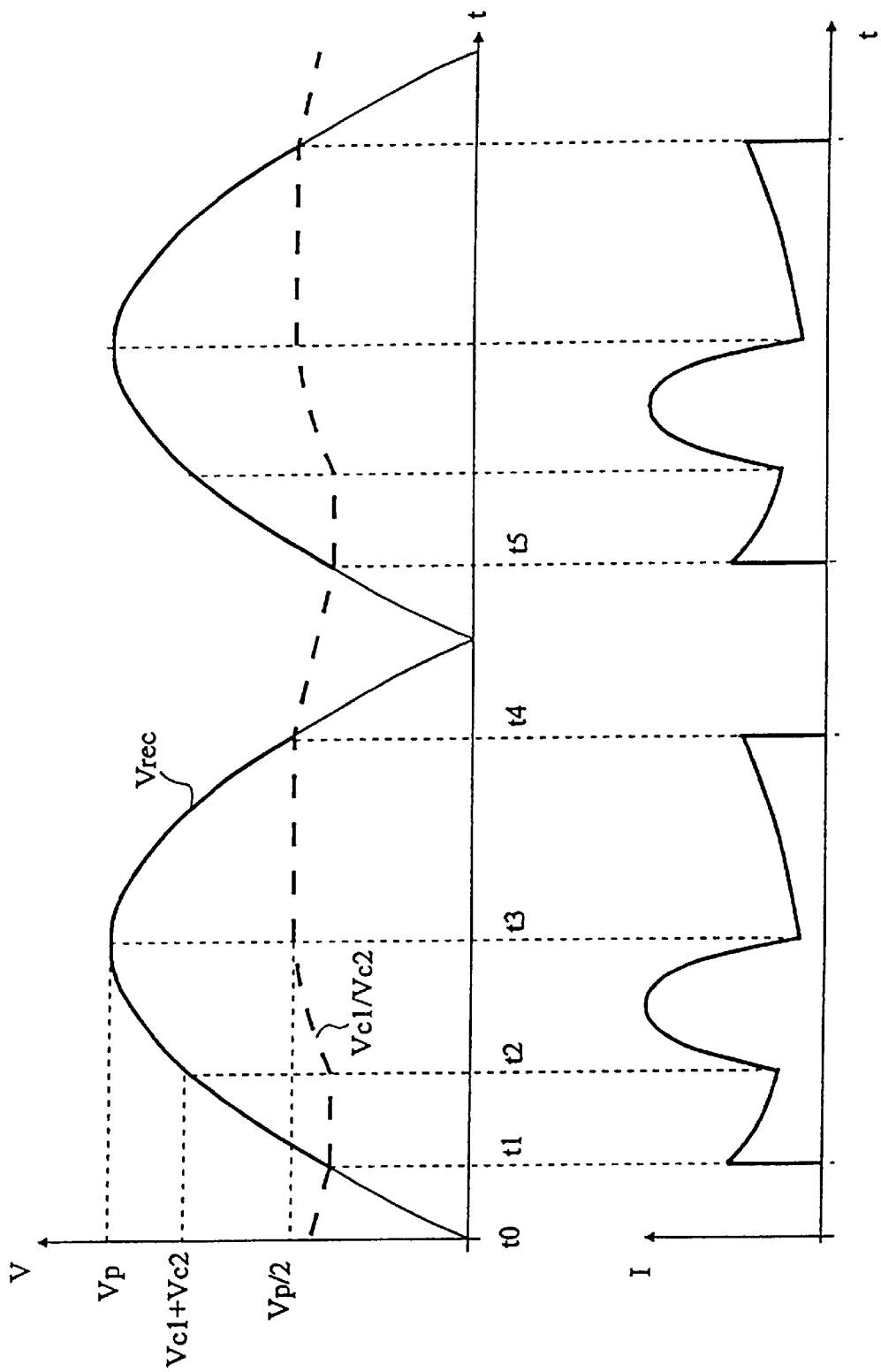
FIG. 1C illustrates various waveforms for explaining the operation of the circuit of FIG. 1A.

FIG. 5 very schematically shows the generalized diagram of a rectifying voltage supply circuit associated with a power factor correction system. This circuit comprises, across a full wave rectifying bridge BR, at least one storing element C associated with a charging path comprising first unidirectional conductive elements of a first polarity 401 and a discharging path comprising second unidirectional conductive elements of a second polarity 402.

The charge and discharge paths respectively have an input terminal 403 and an output terminal 404. Terminals 403 and 404 may be connected as disclosed above to a terminal X of the rectifying bridge BR. However, other connections can be provided. For example, when load 110 is associated with a switch-mode converter, one of the terminals 403 and 404 may be connected to an auxiliary winding or to an intermediate tap or a high side terminal of the primary winding of the converter.

In such a structure, the invention provides for associating a switch 403, 404 with one at least of the first and second unidirectional conductive elements so that, when this or these switches are actuated, the storing element is charged and discharged through a same circuit path.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A multistandard rectified power supply circuit comprising:

a full wave rectifying bridge having an output voltage and adapted to receive an input voltage selected from at least a first source voltage and a second source voltage;

a power factor correction circuit coupled to the output voltage;

switching means for disabling the power factor correction circuit when the first source voltage is selected as the input voltage.

2. The circuit of claim 1, wherein the power factor correction circuit includes:

a charge storage element;

a unidirectional charge path coupled to the charge storage element; and a unidirectional discharge path, coupled to the charge storage element, having a direction opposite to the unidirectional charge path.

3. The circuit of claim 2, wherein the switching means is connected so that at least one of the unidirectional charge path and the unidirectional discharge path is bypassed when the first source voltage is selected as the input voltage.

4. The circuit of claim 3, wherein the charge storage element includes at least two capacitors.

5. The circuit of claim 4, wherein the unidirectional charge path includes at least a first diode of a first polarity and the unidirectional discharge path includes at least a second diode of a second polarity.

6. The circuit of claim 5, wherein at least three diodes are coupled to the at least two capacitors so that each capacitor is differently charged and discharged when the second source voltage is selected as the input voltage.

7. The circuit of claim 6, wherein the at least two capacitors are charged in series and discharged in parallel when the second source voltage is selected as the input voltage.

8. The circuit of claim 6, wherein the at least two capacitors are charged and discharged through a same path when the first source voltage is selected as the input voltage.

9. The circuit of claim 6, further comprising a resistor and a third diode, wherein:

the first or second input voltages each include a first and second input terminal;

the output voltage includes a first and second supply line;

each capacitor of the at least two capacitors includes a first and second terminal;

each diode of the first, second, and third diodes includes an anode and a cathode;

the first terminal of the first capacitor is connected to the first supply line;

the resistor is connected between the second terminal of the first capacitor and the anode of the first diode;

the first terminal of the second capacitor is connected to the cathode of the first diode, and the second terminal of the second capacitor is connected to the second supply line;

the anode of the second diode is connected to the second supply line, and the cathode of the second diode is connected to the second terminal of the first capacitor; and the anode of the third diode is connected to the first terminal of the second capacitor, and the cathode of the third diode is connected to the first supply line.

10. The circuit of claim 9, wherein the switching means comprises a switch connected between the second terminal of the first capacitor and the first terminal of the second capacitor.

11. The circuit of claim 9, wherein the switching means comprises:
- a first switch connected between the second terminal of the first capacitor and the second input terminal of the full wave rectifying bridge; and
- a second switch connected between the first terminal of the second capacitor and the second input terminal of the full wave rectifying bridge.

12. The circuit of claim 9, wherein the switching means comprises:
- a first switch connected in parallel with the second diode; and
- a second switch connected in parallel with the third diode.

13. A method for providing power factor correction for an output of a full wave rectifying bridge, comprising the steps of:
- charging a charge storage element through a charge path coupled to the output;
- discharging the charge storage element through a discharge path coupled to the output, the discharge path being different than the charge path; and
- controlling at least one switch associated with at least one of the charge path and the discharge path so that the charge storage element is charged and discharged through a same circuit path.

14. The method of claim 13, further including the step of adapting the full wave rectifying bridge to receive an input voltage selected from at least a first source voltage and a second source voltage.

15. The method of claim 14, wherein the step of controlling at least one switch includes the steps of:
- selecting the input voltage; and
- controlling at least one switch so that the charge storage element is charged and discharged through the same circuit path when the first source voltage is selected as the input voltage.

* * * * *